(12) United States Patent
Ito et al.

(10) Patent No.: US 8,016,355 B2
(45) Date of Patent: Sep. 13, 2011

(54) SEAT CUSHION ADJUSTING APPARATUS

(75) Inventors: Sadao Ito, Anjo (JP); Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 197 days.

(21) Appl. No.: 12/351,455

(22) Filed: Jan. 9, 2009

(65) Prior Publication Data

US 2009/0195041 A1 Aug. 6, 2009

(30) Foreign Application Priority Data

Jan. 31, 2008 (JP) ................................. 2008-020561

(51) Int. Cl.
*A47C 1/00* (2006.01)
(52) U.S. Cl. ..................... 297/337; 297/311; 297/284.11
(58) Field of Classification Search .................. 297/337, 297/311, 284.11
See application file for complete search history.

(56) References Cited

U.S. PATENT DOCUMENTS

| | | | | |
|---|---|---|---|---|
| 3,446,532 A | * | 5/1969 | Cramer | .......................... 297/312 |
| 4,636,002 A | | 1/1987 | Genjiro | |
| 4,652,049 A | * | 3/1987 | Maruyama et al. | ....... 297/284.11 |
| 4,681,369 A | * | 7/1987 | Simpson | ........................ 297/316 |
| 5,380,063 A | * | 1/1995 | Dauphin | .................. 297/284.11 |
| 6,095,610 A | * | 8/2000 | Okajima et al. | .......... 297/423.36 |
| 6,454,353 B1 | * | 9/2002 | Knaus | ....................... 297/284.11 |
| 7,108,322 B2 | * | 9/2006 | Erker | ......................... 297/284.11 |
| 7,404,602 B2 | * | 7/2008 | Okada et al. | .............. 297/284.11 |
| 7,506,930 B2 | * | 3/2009 | Penley et al. | ............. 297/284.11 |
| 7,597,398 B2 | * | 10/2009 | Lindsay | .................... 297/284.11 |
| 7,614,693 B2 | * | 11/2009 | Ito | ............................. 297/284.11 |
| 2001/0048239 A1 | | 12/2001 | Kogure | |
| 2002/0113473 A1 | * | 8/2002 | Knaus | ...................... 297/284.11 |
| 2007/0090673 A1 | | 4/2007 | Ito | |

FOREIGN PATENT DOCUMENTS

| | | |
|---|---|---|
| FR | 2 569 628 A1 | 3/1986 |
| JP | H6-21443 U | 3/1994 |
| JP | 2002-282087 | 10/2002 |
| JP | 3721934 | 9/2005 |
| JP | 2007-118706 | 5/2007 |

\* cited by examiner

*Primary Examiner* — Laurie Cranmer
(74) *Attorney, Agent, or Firm* — Oblon, Spivak, McClelland, Maier & Neustadt, L.L.P.

(57) ABSTRACT

A seat cushion adjusting apparatus includes: a supporting member, forming a frame of a seat cushion; a seat member and forming an outer shape of the seat cushion; an adjusting member, engaging with an end portion of the seat member; a moving mechanism, rotatably connected to the adjusting member and moving the adjusting member in the front-rear direction of the seat relative to the supporting member; and an adjusting lever, one end thereof rotatably connected to the supporting member and the other end thereof rotatably connected to the adjusting member. The adjusting lever moves the end portion of the seat member by rotating the adjusting member around an axis to adjust the outer shape of the seat cushion in accordance with, a movement of the adjusting member in the front-rear direction of the seat relative to the supporting member by a means of the moving mechanism.

10 Claims, 7 Drawing Sheets

SEAT CUSHION ADJUSTING APPARATUS

CROSS REFERENCE TO RELATED APPLICATIONS

This application is based on and claims priority under 35 U.S.C. §119 to Japanese Patent Application 2008-020561, filed on Jan. 31, 2008, the entire contents of which is incorporated herein by reference.

FIELD OF THE INVENTION

The present invention relates to a seat cushion adjusting apparatus.

BACKGROUND

A known seat cushion adjusting apparatus is disclosed in JP2007-118706A (which is hereinbelow referred to as reference 1). The seat cushion adjusting apparatus according to reference 1 includes: a seat member, forming an outer shape of a seat cushion; a supporting member, supporting the seat member, and an adjusting member, engaged with an end portion of the seat member. The adjusting member is moved in a front-rear direction of a seat relative to the supporting member by a moving mechanism while being rotated around a rotational axis, extending in a width direction of the seat, by a rotational mechanism. Consequently, the end portion of the seat member is moved and an outer shape of the seat member is adjusted. Therefore, a length of the seat cushion (a seat surface) is adjusted so as to suitably support thighs of the occupant according to, for example, his/her physical size at the end portion of the seat member.

According to reference 1, along with a movement of the adjusting member in the front-rear direction of the seat, a guiding pin, fixed at the adjusting member, slides along a guiding hole of a guiding bracket, fixed at the supporting member, and thereby the adjusting member is rotated. Because of a high sliding resistance, an operation force for rotating the adjusting member is increased. For example, high torque is required for an electric motor, functioning as a driving source. Further, strength, (rigidness) of the guiding bracket, at which the guiding hole is formed, needs to be maintained and accordingly the guiding bracket is enlarged by, for example, increasing a thickness thereof.

An X-link moving mechanism is disclosed in a modified embodiment (a second embodiment) of reference 1. In the X-link moving mechanism, in order to elongate a moving distance of the adjusting member in the front-rear direction of the seat relative to the supporting member, each lever (a bar) of the link mechanism needs to be elongated and therefore, the moving mechanism is enlarged. Further, the operation force for rotating the adjusting member is increased because of the high sliding resistance between the guiding pin and the guiding hole.

A need thus exits for a seat cushion adjusting apparatus that is not susceptible to the drawback mentioned above.

SUMMARY OF THE INVENTION

According to an aspect of the present invention, a seat cushion adjusting apparatus includes: a supporting member, forming a frame of a seat cushion; a seat member, supported by the supporting member and forming an outer shape of the seat cushion; an adjusting member, engaging with an end portion of the seat member provided at a front side thereof in a front-rear direction of a seat; a moving mechanism, rotatably connected to the adjusting member and moving the adjusting member in the front-rear direction of the seat relative to the supporting member; and an adjusting lever, one end thereof rotatably connected to the supporting member and the other end thereof rotatably connected to the adjusting member. The adjusting lever moves the end portion of the seat member by rotating the adjusting member around an axis, extending in a width direction of the seat, to adjust the outer shape of the seat cushion in accordance with a movement of the adjusting member in the front-rear direction of the seat relative to the supporting member by means of the moving mechanism.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

A seat cushion adjusting apparatus according to a first embodiment will be described hereinbelow with reference to the attached drawings. Directions such as "front", "rear", "left", "right", "up", "bottom", "forward", "downward", or similar expressions correspond to an orientation of the seat cushion adjusting apparatus according to the embodiments.

Figure 1:
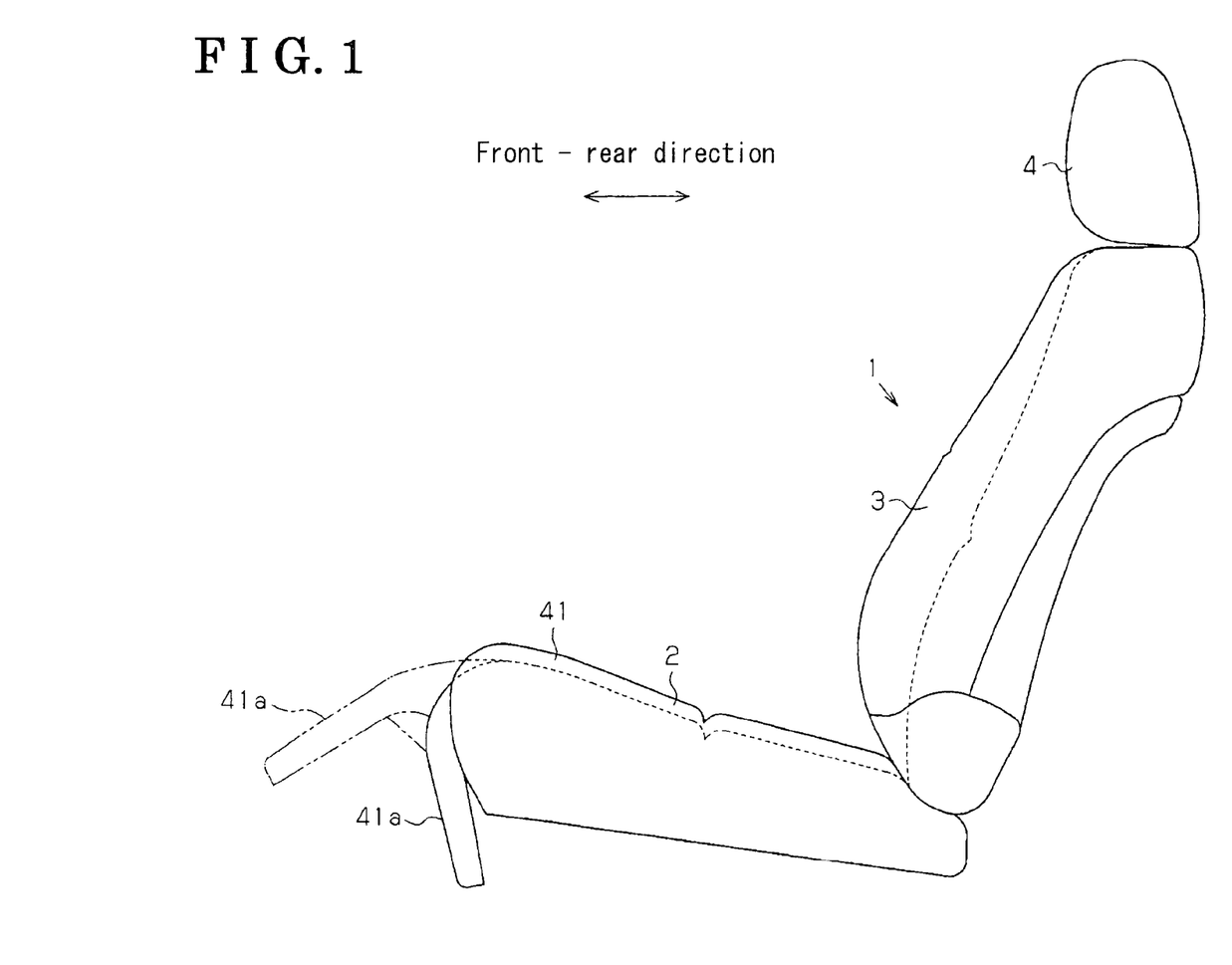
FIG. 1 is a side view illustrating a seat cushion adjusting apparatus according to a first embodiment.

FIG. 1 is a side view schematically illustrating a seat for a vehicle 1 (which is hereinbelow referred to as a seat 1) adapted to a passenger seat side or a rear seat side of the vehicle, such as an automobile or the like. As illustrated in FIG. 1, the seat 1 includes: a seat cushion 2, formed into a seat surface of the seat 1; a seat back 3, tiltably supported at a rear portion of the seat cushion 2; and a headrest 4, supported at an upper portion of the seat back 3.

Figure 2:
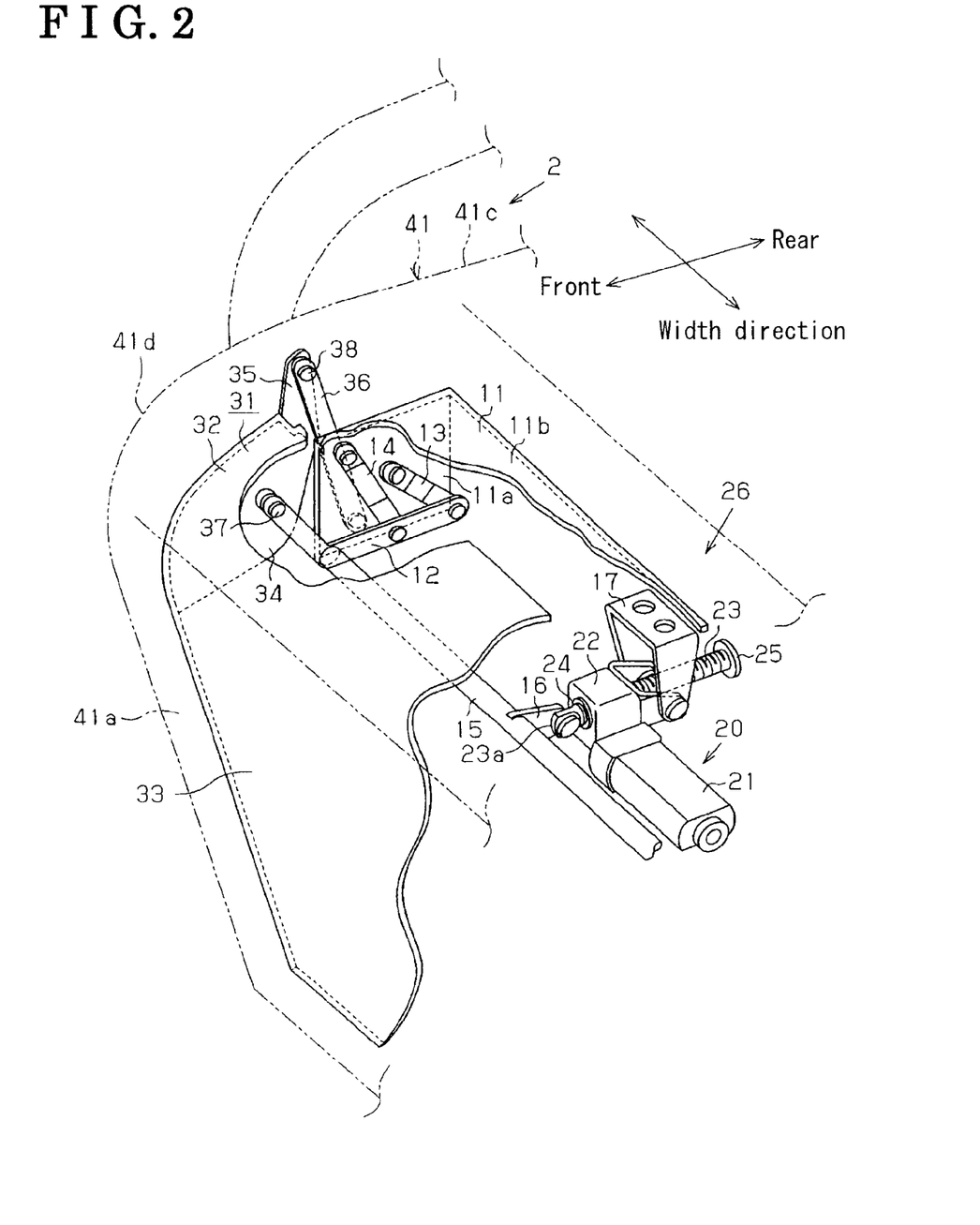
FIG. 2 is a perspective view illustrating the seat cushion adjusting apparatus according to the first embodiment.

FIG. 2 is a perspective view illustrating a structure of a front portion of the seat cushion 2. In FIG. 2, a structure of only one side of the seat cushion 2 in a width direction of the seat 1 (a right side) is mainly illustrated. As illustrated in FIG. 2, a base member 11 (a supporting member), made of a metal plate, is provided at the front portion of the seat cushion 2 so as to extend in the width direction of the seat 1. The base member 11 is formed into a substantially inverted U-shape. More specifically, the base member 11 includes: side plate portions 11a, respectively provided at both ends of the seat 1 in the width direction thereof, and an upper plate portion 11b, provided at upper ends of the side plate portions 11a and connecting the side plate portions 11a. The base member 11 is fixed at a seat cushion frame. The base member 11 and the seat cushion frame form a frame of the seat cushion 2. Structures and functions of left and right sides of the seat cushion adjusting apparatus according to the embodiments are substantially the same. Therefore, only one side of the seat cushion adjusting apparatus will be mainly described hereinbelow.

One end of a second lever 13, made of a metallic bar, is connected at the side plate portion 11a of the base member 11 so as to rotate around a first shaft that extends in the width direction of the seat 1. Likewise, one end, of a third lever 14, made of a metallic bar, is connected at the side plate portion 11a of the base member 11 so as to rotate around a second shaft that extends in the width direction of the seat 1. The third lever 14 is provided at a front side of the second lever 13. The other end of the second lever 13 is connected at a bottom portion of a first lever 12, made of a metallic bar, so as to rotate around a third shaft that extends in the width direction of the seat 1. Likewise, the other end of the third lever 14 is connected at the bottom end portion of the first lever 12, so as to rotate around a fourth shaft that extends in the width direction of the seat 1. A position where the third lever 14 is connected to the first lever 12 is arranged at a front side of a position where the second lever 13 is connected to the first lever 12.

One end of the second lever 13 and one end of the third lever 14, each of which is connected to the base member 11 (the side plate portion 11a), form grounded ends and thereby the first, second and third levers 12, 13 and 14 are configured as a four bar linkage, in which a movement of the first lever 12 is restricted. A front end portion of the first lever 12 is bent upward so that the first lever 12 is formed into a substantially L-shape. An end of a connecting member 15 is fixed to a bent portion of the first lever 12. The connecting member 15, which is formed into a bar shape, extends in the width direction of the seat 1. A pair of the first levers 12, which is provided at left and right sides of the seat 1 in the width direction thereof, is integrally connected to each other by the connecting member 15. A position where the first lever 12 is connected to the connecting member 15 is arranged at a front side of a position where the first lever 12 is connected to each of the second and third levers 13 and 14.

A first attachment portion 16 is provided at intermediate portion of the connecting member 15 in a longitudinal direction thereof. The first attachment portion 16 is formed into a substantially tongue shape. The first attachment portion 16 extends rearward of the seat 1. A fixed member 17 is fixed at a bottom surface of the upper plate portion 11b of the base member 11 at an intermediate portion thereof in the width direction of the seat 1 (at an intermediate portion of the base member 11 in a longitudinal direction thereof). The fixed member 17 is made of a metal plate. The fixed member 17 is formed into a substantially inverted U-shape. A driving member 20 is supported at a bottom portion of the fixed member 17. The driving member 20 includes an electric motor 21, a deceleration mechanism 22 and a feed screw 23. The electric motor 21 functions as a driving source. The deceleration mechanism 22 supports the electric motor 21 and is attached to the fixed member 17. The feed screw 23 extends in a front-rear direction of the seat 1. The feed screw 23 is screwed into a nut member accommodated in the deceleration mechanism 22. A front end 23a of the feed screw 23 is attached to the first attachment portion 16. In the driving member 20, rotation of the electric motor 21 is decelerated by the deceleration mechanism 22 and then a female screw of the nut member is rotated. The feed screw 23, which is prevented from rotating around a screwing axis by the first attachment portion 16, is thereby screwed out of the deceleration mechanism 22 in the front-rear direction of the seat 1. Consequently, the connecting member 15, which is attached to the front end 23a via the first attachment portion 16, and the first lever 12 are moved. The driving member 20 together with the first, second and third levers 12, 13 and 14 and the connecting member 15 are configured as a movable member 26. The driving member 20 is accommodated substantially within a range of the base member 11 in the front-rear direction of the seat 1. In other words, the driving member 20 is arranged so as to overlap each of the first, second and third levers 12, 13 and 14 in the front-rear direction of the seat 1.

A movement of the feed screw 23 in the front-rear direction of the seat 1 is restricted within a predetermined range by ring-shaped stoppers 24 and 25. The stoppers 24 and 25 are respectively provided at a rear side of the front end 23a and a rear end of the feed screw 23. The front end 23a of the feed screw 23 is rotatably connected to the first attachment portion 16 so as to allow a swinging movement of the connecting member 15 (the first lever 12).

A deformed drum 31 (an adjusting member) is provided at a front side of the base member 11. The deformed drum 31, which is made of a metallic plate, extends in the width direction of the seat 1. The deformed drum 31 integrally includes a drum surface portion 32, a planar portion 33 and a side wall portion 34, and is formed thereby into a substantially eaves-shape. A cross-section of the drum surface portion 32 is formed into a circular shape. The planar portion 33 is integrally provided at an end of the drum surface portion 32 so as to extend in a direction of a tangent line of the circular shape of the drum surface portion 32 in the cross-section thereof. A cross-section of the planar portion 33 is formed into a substantially straight line. The side wall portion 34 extends downwardly from an end of the drum surface portion 32 in the width direction of the seat 1 so as to be in parallel to the side plate portion 11a. Further, an upper end portion of the first lever 12 is provided at the side wall portion 34 so as to rotate around a first supporting shaft 37, whose axis extends in the width direction of the seat 1. Therefore, the deformed drum 31 is moved in accordance with a movement of the first lever 12 when the driving member 20 is operated. The first, second and third levers 12, 13 and 14, which are configured as the four bar linkage, restrict the movement of the first lever 12 so that the first supporting shaft 37 is moved in a substantially straight line in the front-rear direction of the seat 1. Lengths of the first, second and third levers 12, 13 and 14 and a position where each of the first, second and third levers 12, 13 and 14 is connected to the base member 11 are determined so that the first supporting shaft 37 is moved in the substantially straight line in the front-rear direction of the seat 1.

Figure 3A:
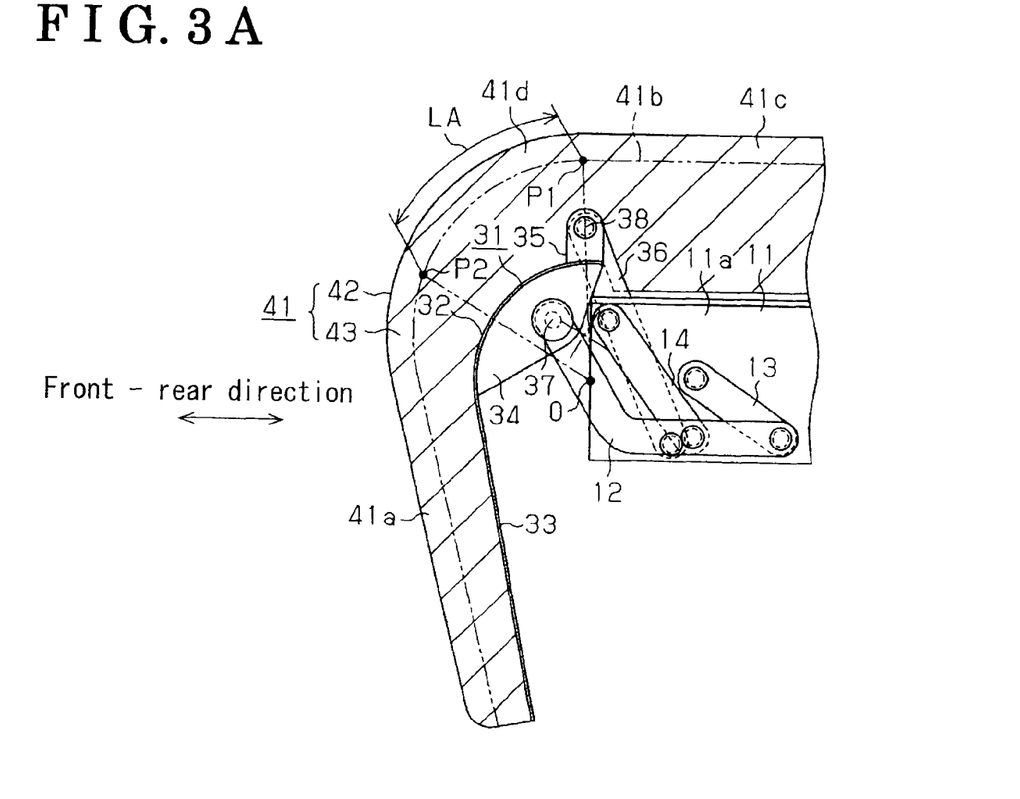
FIG. 3A is a cross-sectional view illustrating an operation of the seat cushion adjusting apparatus according to the first embodiment.
Figure 3B:
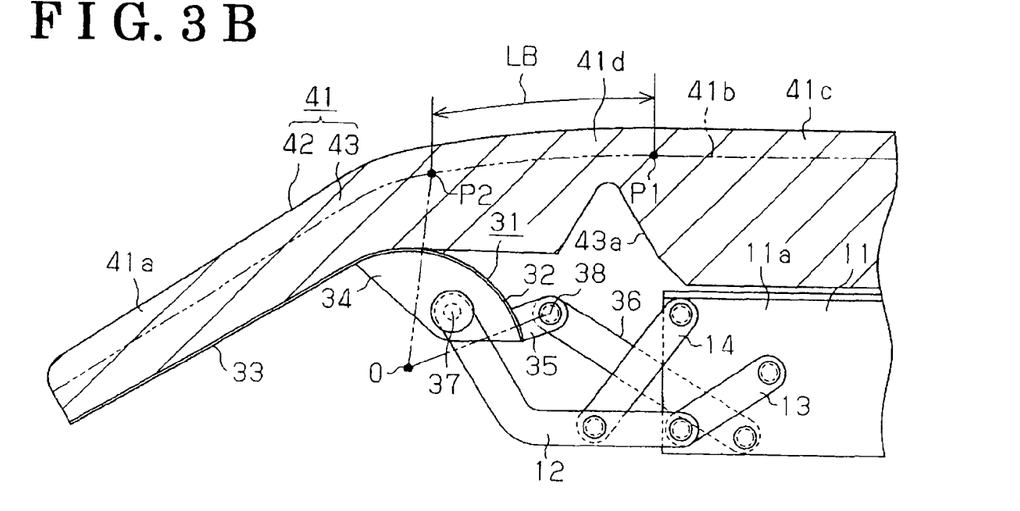
FIG. 3B is a cross-sectional view illustrating the operation of the seat cushion adjusting apparatus according to the first embodiment.

The deformed drum 31 further includes a second attachment portion 35. The second attachment portion 35 extends upward from the side wall portion 34. One end of an adjusting lever 36, made of a metallic bar, is rotatably connected to the side plate portion 11a. The other end of the adjusting lever 36 is connected to the second attachment portion 35 so as to rotate around a second supporting shaft 38, whose axis extends in the width direction of the seat 1. The adjusting lever 36 is rotated relative to the base member 11 in accordance with the substantially straight line movement of the first supporting shaft 37 in the front-rear direction of the seat 1. The adjusting lever 36 moves the second supporting shaft 38 along a rotational path described by the adjusting lever 36. Consequently, the deformed drum 31 is rotated around a rotational axis O (see FIGS. 3A and 3B) that extends in the width direction of the seat 1 so as to pass a center of the circular shape of the drum surface portion 32 in the cross-section thereof;

A seat member 41 is supported by the base member 11. The seat member 41 forms an outer shape of the seat cushion 2. As illustrated in FIGS. 3A and 3B, the seat member 41 includes a cover 42 and a cushion 43. The cover 42, made of leather or a fabric, is provided at an exterior of the seat member 41 and thereby forms a seat surface for an occupant. The cushion 43 is made of a buffer material, such as polyurethane accommodated inside the cover 42. The seat member 41 further includes a seat portion 41c and a front end portion 41a (an end portion). The seat portion 41c supports a hip portion of the occupant. The front end portion 41a extends from a front edge of the seat portion 41c, is wound around the drum surface portion 32 of the deformed drum 31, and extends along the planar portion 33. A front end of the cover 42, covering the cushion 43, is fixed at a front end of the planar portion 33 by glue or by an engagement means and thereby the front end portion 41a is engaged with the deformed drum 31. Therefore, the front end portion 41a of the seat member 41 is moved in accordance with a rotation of the deformed drum 31 and thereby an outer shape of the seat member 41 is adjusted. A deformed portion 41d, which is deformed in accordance with the rotation of the deformed drum 31, is provided at a portion of the front end portion 41a close to the seat portion 41c (a portion between a first point P1 and a second point P2 in FIGS. 3A and 3B).

More specifically, as illustrated in FIG. 3A, when the deformed drum 31 is maximally rotated in a counter-clockwise direction in FIG. 3A in a rearward retracted manner, the front end portion 41a, guided by the planar portion 33, extends downward and slightly rearward, and the deformed portion 41d is bent along the drum surface portion 32 of the deformed drum 31. Consequently, the front end portion 41a is arranged in a state of being prevented from contacting the occupant (a stored state). On the other hand, as illustrated in FIG. 3B, when the deformed drum 31 is maximally rotated in a clockwise direction in FIG. 3B in a forward protruding manner, an end of the front end portion 41a is raised upward and the front end portion 41a, guided by the planar portion 33, extends forward. Therefore, the deformed portion 41d is deformed in a direction where a bending degree thereof is reduced. The front end portion 41a is spaced away from the rear of the deformed drum 31 (the drum surface portion 32) and thereby arranged in a state of protruding so as to support lower legs of the occupant (an extended state). Thus, the front end portion 41a functions as an ottoman. In other words, an extended position of the front end portion 41a, wounded around the deformed drum 31 (the drum surface portion 32), is moved so that the end of the front end portion 41a is raised upward accompanying the rotation of the deformed drum 31. Consequently, the front end portion 41a suitably supports the lower legs of the occupant. Therefore, the occupant may be seated comfortably.

A slit 43a is provided at the cushion 43 in the vicinity of a front end of the base member 11. The slit 43a is cut away so as to be formed into a substantially triangular-shaped groove extending in the width direction of the seat 1. The slit 43a facilitates extension and contraction of a back surface of the deformed portion 41d. Therefore, when the front end portion 41a (the ottoman) is stored or extended, the deformed portion 41d and the seat member 41 (the cushion 43) are prevented from being excessively deformed.

According to the first embodiment, an intermediate surface 41b is provided in the vicinity of the front surface of the seat member 41 at an intermediate portion between a front surface and a back surface of the seat member 41. The front surface of the seat member 41 (the deformed portion 41d) in the embodiments corresponds to a surface contacting the occupant when the occupant is seated. The back surface of the seat member 41 (the deformed portion 41d) in the embodiments corresponds to a surface opposed to the front surface. Even when the deformed drum 31 is rotated or the like, a length of the front end portion 41a of the seat member 41 is not changed at a position of the intermediate surface 41b, and the length thereof is maintained to be substantially the same. In other words, even when the deformed drum 31 is rotated or the like, the intermediate surface 41b is neither extended nor contracted. As illustrated in FIGS. 3A and 3B, the rear end position and a front end position of the intermediate surface 41b at the deformed portion 41d are respectively defined as the first point P1 and the second point P2. A length of the intermediate surface 41b between the first and second points P1 and P2 is defined as a first length L1 or a second length L2. A relationship between the first and second lengths LA and LB is determined as follows: LA≈LB. When the front end portion 41a (the ottoman) is stored, a front surface side of the intermediate surface 41b is extended and a back surface side thereof is contracted. However, it is prevented that only one side thereof is excessively extended or contracted. Likewise, when the front end portion 41a (the ottoman) is extended, the front surface side of the intermediate surface 41b is contracted and the back surface side thereof is extended. However, it is prevented that only one side thereof is excessively extended or contracted. According to the first embodiment, the intermediate surface 41b is provided closer to the front surface of the deformed portion 41d than the center surface of the front and back surfaces thereof is.

A modified embodiment of a seat cushion adjusting apparatus, in which structures of the deformed drum 31 and the seat member 41 of the first embodiment are modified, will be described hereinbelow. In the modified embodiment, part of the structure of the seat cushion adjusting apparatus of the first embodiment is modified so that a seat cushion adjusting apparatus according the modified embodiment is adapted to a driver seat. The same reference numerals are provided to the same structures and part of the explanations for the same structures will not be repeated.

Figure 4:
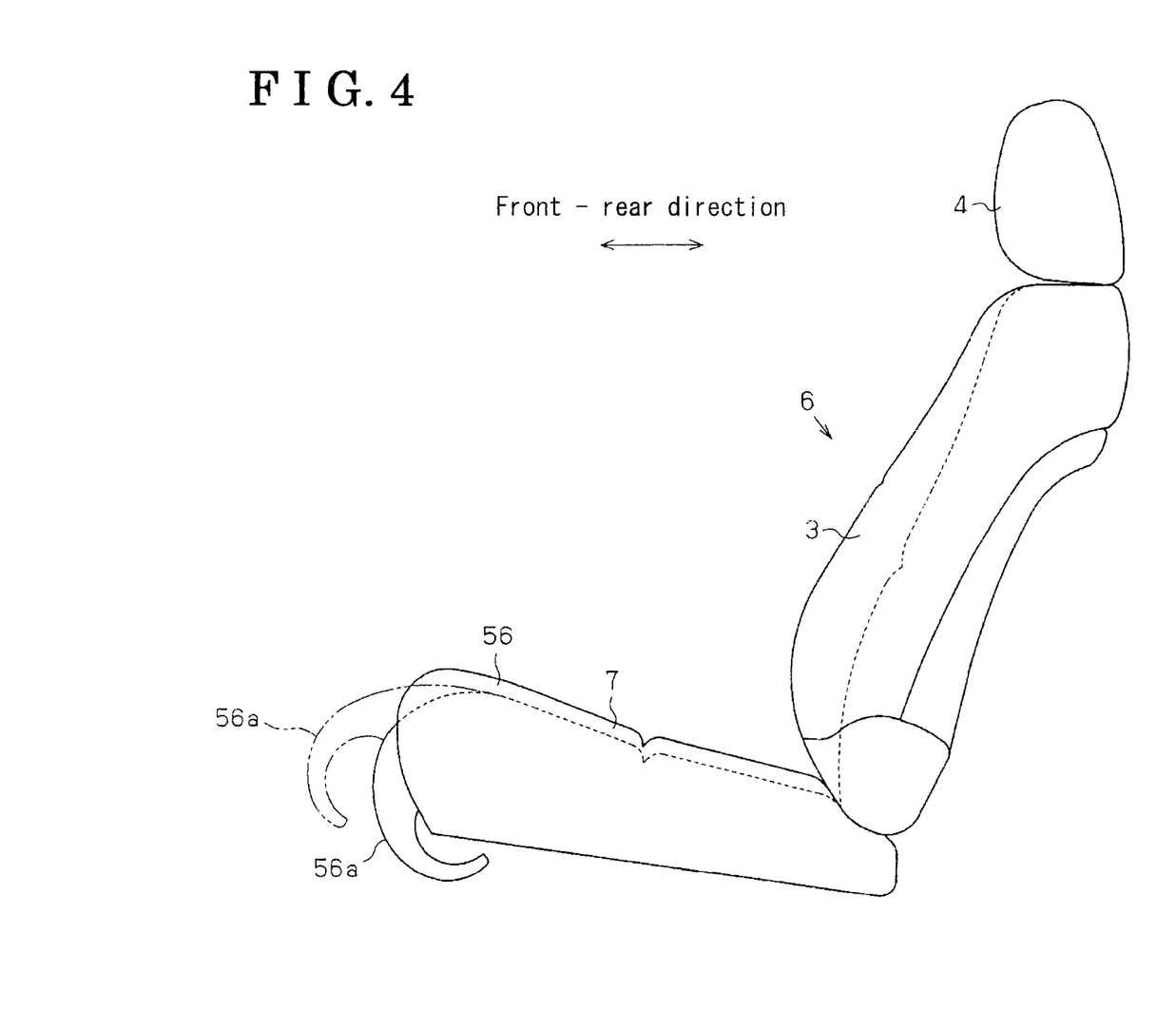
FIG. 4 is a side view illustrating the seat cushion adjusting apparatus according to a modified embodiment of the first embodiment.

FIG. 4 is a side view schematically illustrating a seat for a vehicle 6 (which is hereinbelow referred to as a seat 6) adapted to a driver seat side of the vehicle. As illustrated in FIG. 4, the seat 6 includes: a seat cushion 7, formed into a seat surface of the seat 6; the seat back 3; and the headrest 4.

Figure 5A:
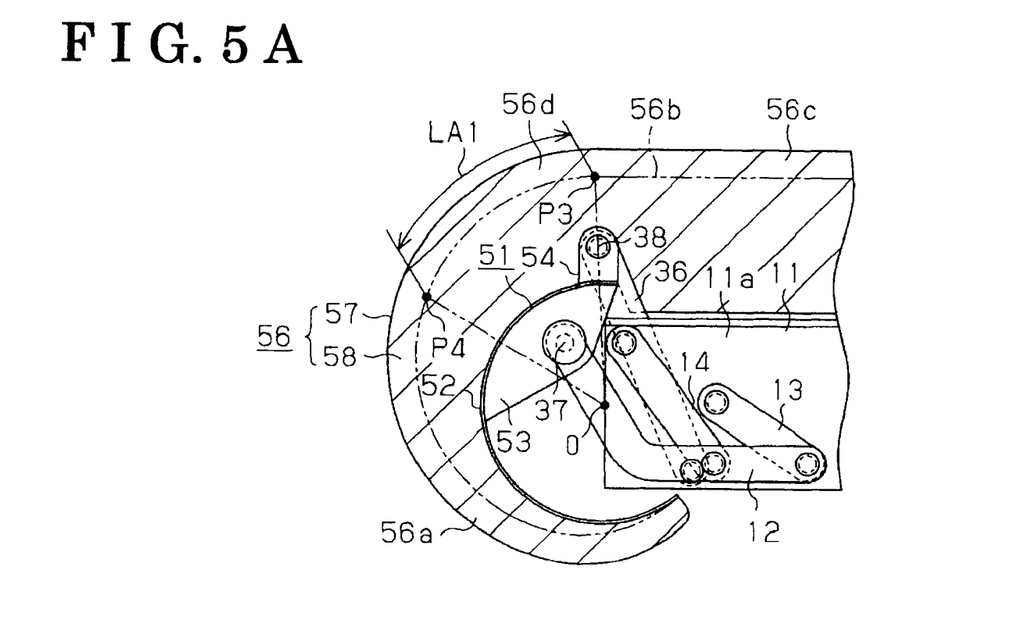
FIG. 5A is a cross-sectional view illustrating an operation of the seat cushion adjusting apparatus according to the modified embodiment of the first embodiment.
Figure 5B:
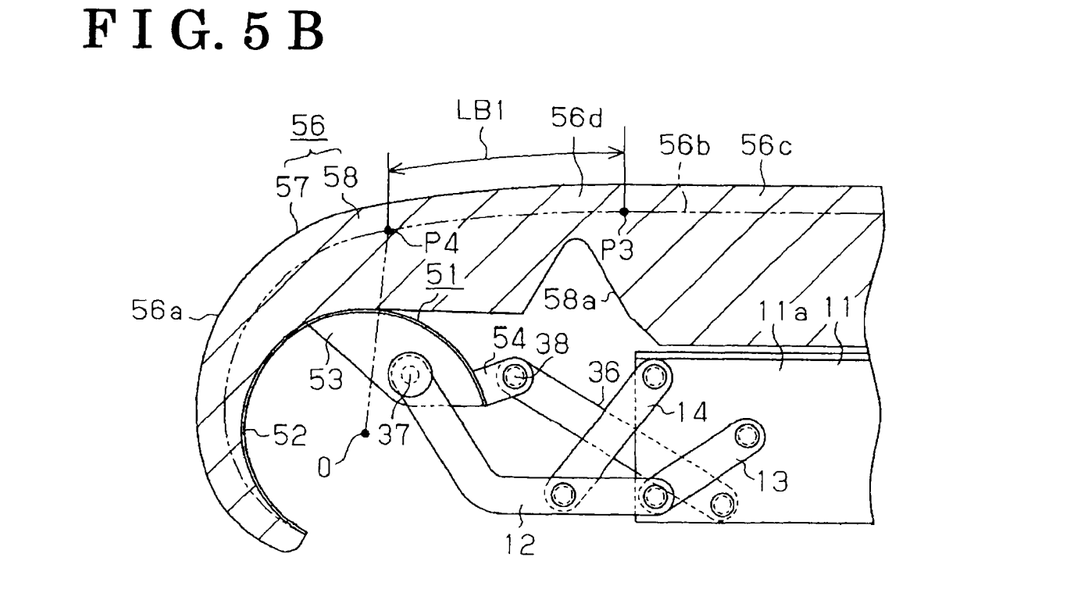
FIG. 5B is a cross-sectional view illustrating the operation of the seat cushion adjusting apparatus according to the modified embodiment of the first embodiment.

As illustrated in FIGS. 5A and 5B, a drum 51 (an adjusting member) is provided at a front side of the base member 11. The drum 51, which is made of a metallic plate, extends in the width direction of the seat 6. The drum 51 integrally includes a drum surface portion 52 and a side wall portion 53, and thereby formed into a substantially crescent-shape. A cross-section of the drum surface portion 52 is formed into a circular shape. The side wall portion 53 extends downward from an end of the drum surface portion 52 in the width direction of the seat 6 so as to be in parallel to the side plate portion 11a. Further, the upper end portion of the first lever 12 is provided at the side wall portion 53 so as to rotate around the first supporting shaft 37, whose axis extends in a width direction of the seat 1. Therefore, the drum 51 is moved in the manner described above in accordance with the movement of the first lever 12 when the driving member 20 (see FIG. 2) is operated.

The drum 51 further includes a second attachment portion 54. The second attachment portion 54 extends upward from the side wall portion 53. The other end of the adjusting lever 36 is connected to the second attachment portion 54 so as to rotate around the second supporting shaft 38. In accordance with a substantially straight line movement of the first supporting shaft 37 in a front-rear direction of the seat 6, the adjusting lever 36 restricts a movement of the drum 51 to rotate around the rotational axis O, which extends in the width direction of the seat 6 and passes a center of the circular shape of the drum surface portion 52 in the cross-section thereof.

A seat member 56 is supported by the base member 11. The seat member 56 forms an outer shape of the seat cushion 7. As well as the seat member 41, the seat member 56 includes a cover 57 and a cushion 58. The seat member 56 further includes a seat portion 56c and a front end portion 56a (an end portion). The seat portion 56c supports the hip portion of the occupant. The front end portion 56a extends from a front edge of the seat portion 56c and is wound around the drum surface portion 52 of the drum 51 so as to extend along the drum surface portion 52. A front end of the cover 57, covering the cushion 58, is fixed at a front end of the drum surface portion 52 by glue or by an engagement means and thereby the front end portion 56a is engaged with the drum 51. Therefore, the front end portion 56a of the seat member 56 is moved in accordance with a rotation of the drum 51 and thereby an outer shape of the seat member 51 is adjusted. A deformed portion 56d, which is deformed in accordance with the rotation of the drum 51, is provided at a portion of the front end portion 56a closer to a seat portion 56c (a portion between a first point P3 and a second point P4 in FIGS. 5A and 5B).

More specifically, as illustrated in FIG. 5A, when the drum 51 is maximally rotated in a counter-clockwise direction in FIG. 5A in a rearward retracted manner, the front end portion 56a, guided by the drum surface portion 52 is retracted rearward and the deformed portion 56d is bent along the drum surface portion 52 of the drum 51. Consequently, the front end portion 56a is contracted in the front-rear direction of the seat 6 and is arranged in a state for suitably supporting thighs of an occupant whose thighs are shorter than a predetermined length (a contracted state). On the other hand, as illustrated in FIG. 5B, when the drum 51 is maximally rotated in a clockwise direction in FIG. 5B in a forward protruding manner, an end of the front end portion 56a, guided by the drum surface portion 52, protrudes forward. Therefore, the deformed portion 56d is deformed in a direction where a bending degree thereof is reduced. Consequently the front end portion 56a is extended in the front-rear direction of the seat 6 and arranged in a state for suitably supporting thighs of an occupant whose thighs are longer than a predetermined length (an extended state). In other words, by adjusting a length of the seat 6 in the front-rear direction thereof (a length of the seat member 56) in accordance with the drum 51, the front end portion 56a suitably supports thighs of an occupant according to a physical size of the occupant.

As well as the cushion 43 of the first embodiment, the cushion 58 is provided with a slit 58a. Therefore, when the front end portion 56a is contracted or extended, the deformed portion 56d and the seat member 56 (the cushion 58) are prevented from being excessively deformed.

According to the first embodiment, an intermediate surface 41b is provided in the vicinity of the upper surface of the seat member 56 at an intermediate portion between a front surface and a back surface of the seat member 56. The front surface of the seat member 56 (the deformed portion 56d) in the embodiments corresponds to a surface contacting the occupant when the occupant is seated. The back surface of the seat member 56 (the deformed portion 56d) in the embodiments corresponds to a surface opposed to the front surface. Even when the drum 51 is rotated or the like, a length of the front end portion 56a of the seat member 56 is not changed at a position of the intermediate surface 56b, and the length thereof is maintained to be substantially the same. In other words, even when the drum 51 is rotated or the like, the intermediate surface 56b is neither extended nor contracted. As illustrated in FIGS. 5A and 5B, a rear end position and a front end position of the intermediate surface 56b at the deformed portion 56d are respectively defined as the first point P3 and the second point P4. A length of the intermediate surface 56b between the first and second points P3 and P4 is defined as a first length L1 or a second length L2. A relationship between the first and second lengths LA and LB is determined as follows: LA≈LB. When the front end portion 56a is contracted, a front surface side of the intermediate surface 56b is extended and a back surface side thereof is contracted. However, it is prevented that only one side thereof is excessively extended or contracted. Likewise, when the front end portion 56a is extended, the front surface side of the intermediate surface 56b is contracted and the back surface side thereof is extended. However, it is prevented that only one side thereof is excessively extended or contracted. According to the modified embodiment, the intermediate surface 56b is provided closer to the front surface of the deformed portion 56d than the center surface of the front and back surfaces thereof is.

As described above, the following effects may be obtained according to the embodiments. According to the embodiments, the deformed drum 31 (which is hereinbelow referred to as the drum 31) or the drum 51 for adjusting the outer shape of the seat cushion 2, 7 is rotated by an operation (a swinging movement) of the adjusting lever 36, whose ends are respectively rotatably connected at the base member 11 and the drum 31, 51. Therefore, when the drum 31, 51 is rotated, unnecessary sliding resistance is prevented from being generated. Consequently, an operation force for rotating the drum 31, 51 (an operation force for adjusting the outer shape of the seat cushion 2, 7) is reduced. As a result, a torque required for the electric motor 21, functioning as the driving source, is reduced and a cost is decreased. Further, the adjusting lever 36 only needs to be sufficiently strong (rigid) to rotate the drum 31, 51 at a connecting position of the adjusting lever 36 and the drum 31, 51. Therefore, the adjusting lever 36 is prevented from being enlarged by, for example, increasing a thickness thereof.

According to the embodiments, one end of the second lever 13 and one end of the third lever 14, each of which is connected to the base member 11, form grounded ends, and thereby the first, second and third levers 12, 13 and 14 are configured as the four bar linkage, in which the movement of the first lever 12 is restricted by the second and third levers 13, 14. Consequently, the drum 31, 51, connected to the first lever 12, is moved relative to the base member 11 in the front-rear direction of the seat 1, 6. The moving mechanism 26, which moves the drum 31, 51 relative to the base member 11 in the front-rear direction of the seat 1, 6, is formed by a link mechanism (the four bar linkage), and therefore the moving mechanism 26 is more freely arranged. Accordingly, a space required to arrange the moving mechanism 26 (the first, second and third levers 12, 13 and 14) is reduced in the front-rear direction of the seat 1, 6. The moving mechanism 26 is therefore prevented from contacting, for example, peripheral members provided at the rear thereof. Although a space provided at the bottom of the front end portion 41a, 56a differs depending on a structure of the seat cushion 2, 7, a sufficient space is provided at the bottom of the front end portion 41a, 56a.

According to the embodiments, in order to arrange the driving member 20 and the first, second and third levers 12, 13 and 14 so as to overlap with each other in the front-rear direction of the seat 1, 6, a connecting position of the first lever 12 to/with the connecting member 15 is provided at a front side of a connecting position of the first lever 12 to/with each of the second and third levers 13, 14. Therefore, an entire structure of the seat cushion adjusting apparatus is downsized in the front-rear direction thereof.

According to the embodiments, the front end portion 41a, 56a is engaged with the drum 31, 51 in the following manner: even when the drum 31, 51 is rotated, a length of the intermediate surface between the end close to the seat portion 41c, 56c and the end close to the front end portion 41a, 56a, which is positioned between the front and back surfaces of the deformed portion 41d, 56d, is substantially the same. Therefore, it is prevented that a length of only one surface of the front and back surfaces of the deformed portion 41d, 56d is excessively changed. Therefore, it is prevented that the front or back surface of the deformed portion 41d, 56d is excessively extended or contracted. The seat member 41, 56 is prevented from being wrinkled or strained, and thereby prevented from being entirely deformed. Regardless of an adjusted position of the front end portion 41a, 56a, a shape of the seat member 41, 56 is suitably maintained and an outer appearance thereof is improved.

According to the embodiments, the rotational axis O of the drum 31, 51 is an imaginary axis determined according to the swinging movement of the adjusting lever 36. Therefore, an actual rotational shaft does not need to be provided. Accordingly, the drum 31, 51 is more freely shaped and arranged, and the number of components is reduced.

According to the embodiments, only by modifying shapes of the seat cushion 2, 7 and the drum 31, 51, the seat cushion adjusting apparatus functions both as an ottoman mechanism that supports the lower legs of the occupant on the passenger seat or the like, and as a seat cushion length adjustable mechanism according to a physical size (lengths of thighs) of the occupant on the driver seat.

According to the embodiments, the front end portion 41a, 56a that is engaged with the drum 31, 51, in other words, the front end portion 41a, 56a whose outer shape is adjusted, and the cover 42, 57, are integrally formed with the seat member 41, 56. Therefore, an unnecessary separation line is prevented from being generated at a boundary therebetween and thereby improving its design. Further, an unnecessary uneven leveled surface is prevented from being generated and thereby the occupant is released from feeling uncomfortable.

According to the embodiments, the intermediate surface 41b, 56b is provided closer to the front surface of the deformed portion 41d, 56d than the center surface of the front and back surfaces thereof is. Therefore, a change in length (extension and contraction) at the front surface side of the deformed portion 41d, 56d is restrained compared to the back surface side thereof.

According to the embodiments, extension and contraction of the back surface side of the deformed portion 41d, 56d is facilitated by the slit 43a, 58a. Therefore, the deformed portion 41d, 56d, or even the seat member 41, 56 are prevented from being excessively deformed in accordance with extension and contraction of the back surface of the deformed portion 41d, 56d.

Second Embodiment

A seat cushion adjusting apparatus according to the second embodiment and the modified embodiment of the second embodiment will be described hereinbelow with reference to the attached drawings. According to the second embodiment, the seat cushion adjusting apparatus is structured by only modifying the moving mechanism 26 of the first embodiment. Therefore, the same reference numerals are provided to the same structures and the same explanation will not be repeated.

As illustrated in FIGS. 6A, 6B, 7A and 7B, a moving mechanism 61 of the second embodiment includes a guiding member 62, having a guiding hole 62a and a slider 63. The guiding member 62 is formed into a substantially block shape. The guiding hole 62a is provided at each side of the base member 11 in the width direction of the seat 1, 6 so as to penetrate the guiding member 62 in the front-rear direction of the seat 1, 6. A cross-section of the guiding hole 62a is substantially stable. The slider 63, made of a bar, is slidably inserted into the guiding hole 62a. The slider 63 is driven by a driving member, such as an electromagnetic solenoid, for example. A third attachment portion 64, extending upward, is provided at a front end portion of the slider 63. The drum 31, 51 is connected to the third attachment portion 64 so as to rotate around the first supporting shaft 37. Therefore, the first supporting shaft 37 is moved in a substantially straight line in the front-rear direction of the seat 1, 6 in accordance with a movement of the slider 63 in the front-rear direction of the seat 1, 6 guided by the guiding member 62.

Figure 6A:
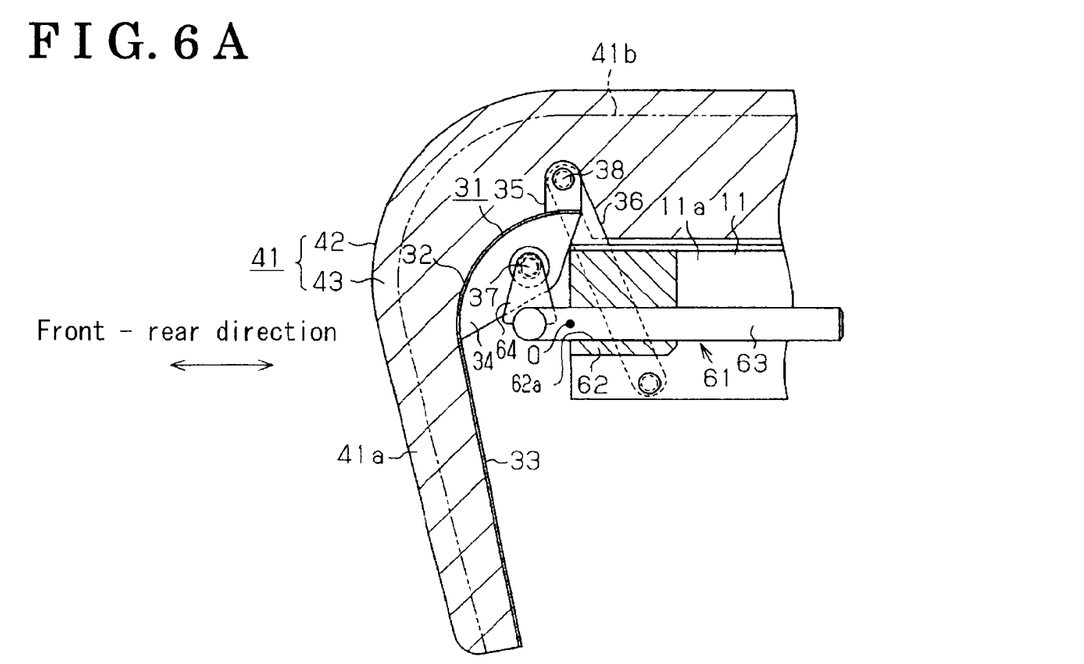
FIG. 6A is a cross-sectional view illustrating an operation of the seat cushion adjusting apparatus according to a second embodiment.
Figure 6B:
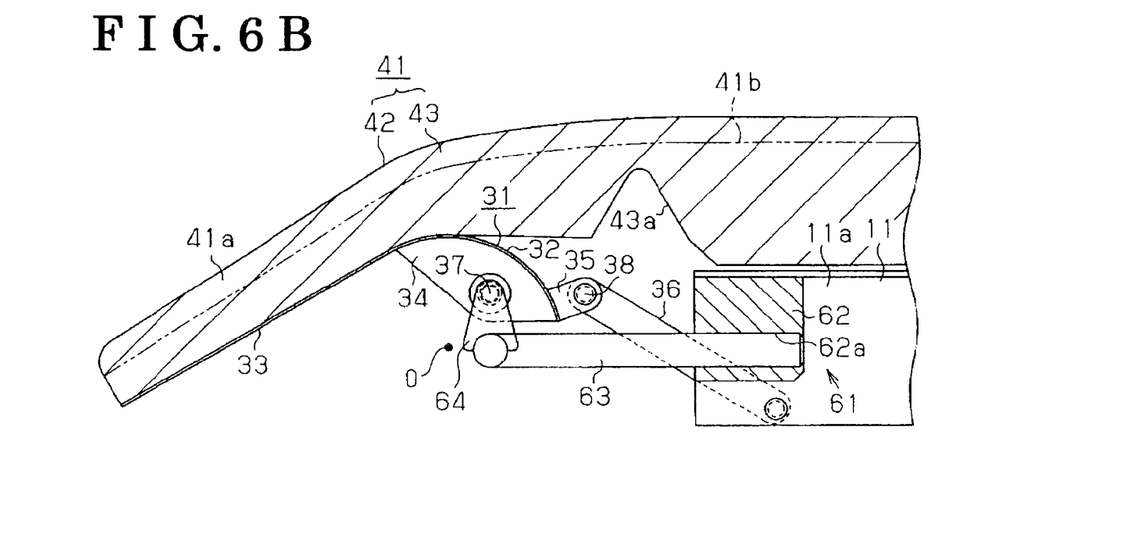
FIG. 6B is a cross-sectional view illustrating, the operation of the seat cushion adjusting apparatus according to the second embodiment.
Figure 7A:
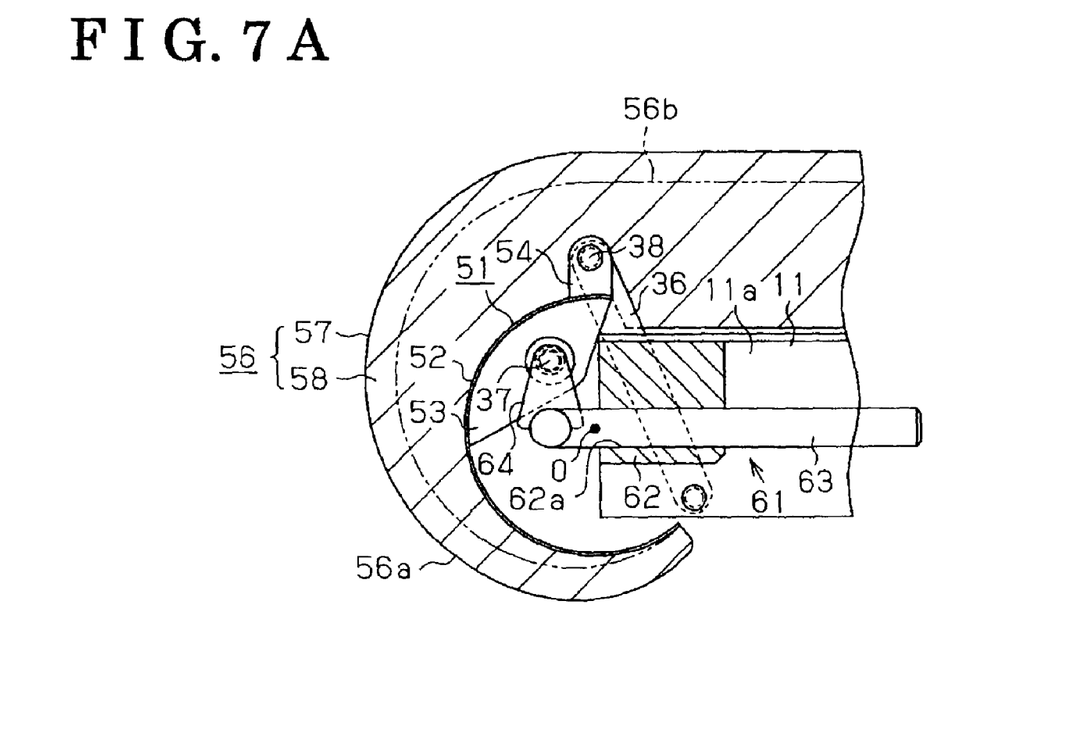
FIG. 7A is a cross-sectional view illustrating an operation of the seat cushion adjusting apparatus according to a modified embodiment of the second embodiment.
Figure 7B:
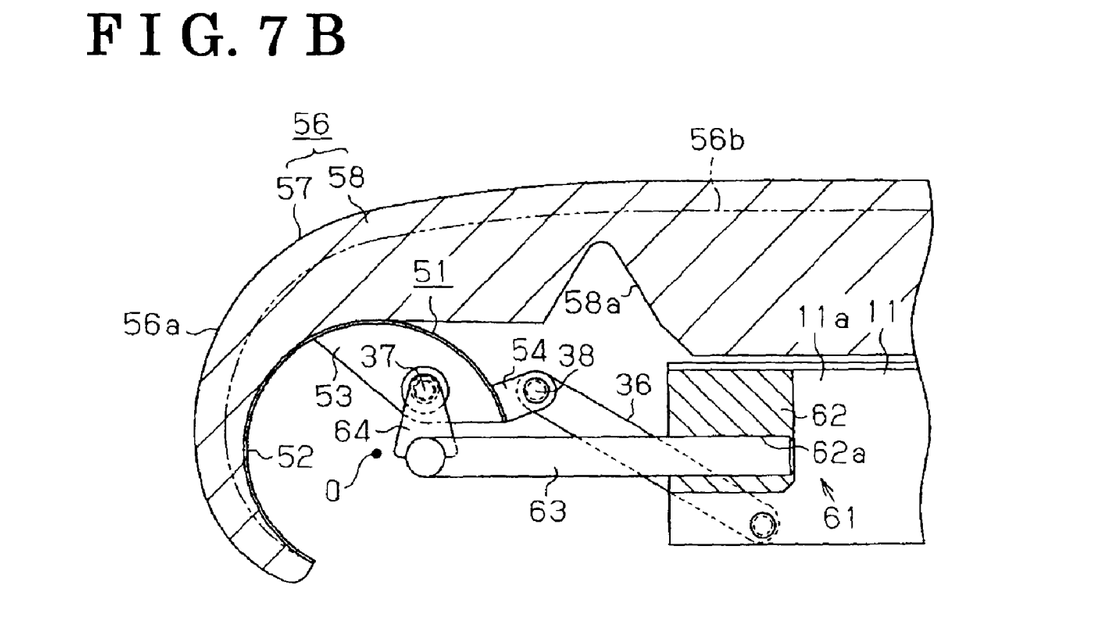
FIG. 7B is a cross-sectional view illustrating the operation of the seat cushion adjusting apparatus according to the modified embodiment of the second embodiment.

As well as in the first embodiment, in accordance with the straight line movement of the first supporting shaft 37 in the front-rear direction of the seat 1, 6, the adjusting lever 36 restricts the movement of the drum 31, 51 so as to be rotated around the rotational axis O. As illustrated in FIGS. 6A and 6B, an extended position of the front end portion 41a is changed so that a front end thereof is moved upward and downward in accordance with the rotational movement of the deformed drum 31. Consequently, the front end portion 41a suitably supports the lower legs of the occupant. As illustrated in FIGS. 7A and 7B, a length of the front end portion 56a in the front-rear direction of the seat 1, 6 (a length of the seat member 56) is changed in accordance with the rotational movement of the drum 51. Consequently, the front end portion 56a suitably supports the lower legs of the occupant according to his/her physical size.

As described above, according to the second embodiment, the following effects may be obtained in addition to the effects of the first embodiment and the modified embodiment of the first embodiment described in paragraphs [0041] and [0044]-[0049]. According to the second embodiment, the moving mechanism 61 moves the drum 31, 51 in the front-rear direction of the seat 1, 6 relative to the base member 11 in a simple structure (a slide mechanism): a movement of the slider 63, at which the drum 31, 51 is connected, is guided by the guiding member 62, which is provided at the base member 11. Therefore, a sufficient space may be obtained in the upper-lower direction of the moving mechanism 61.

The embodiments may be modified as follows. In the first embodiment, a driving member, such as a rack or a sector gear, may be used instead of the feed screw 23.

In the first embodiment, the drive force of the driving member 20 for moving the first supporting shaft 37 in the front-rear direction of the seat 1, 6 may be transmitted to the second or third lever 13, 14. Further, in each of the embodiments, the front end portion 41a, 56a may be engaged with the drum 31, 51 so that a length of the front surface of the deformed portion 41d, 56d between an end close to the seat portion 41c, 56c and an end close to the front end portion 41a, 56a is unchanged regardless of a rotational state of the drum 31, 51. In such a case, the length of the front surface of the deformed portion 41d, 56d is prevented from being changed.

In each of the embodiments, stretch material, which allows extension and contraction, may be used for the cover 42, 57 and the cushion 43, 58. Specifically, stretch fabric may be adapted to the cover 42, 57. When leather, which is less stretchable, is adapted to the cover 42, 57, the intermediate surface 41b, 56b is provided as close to the front surface thereof as possible.

In each of the embodiments, a length and a moving stroke of each of the first, second and third levers 12, 13 and 14 and the adjusting lever 36, which relates to an operation of the front end portion 41a functioning as the ottoman mechanism, may be determined so as to extend a range for holding the lower legs of the occupant at the front end portion 41a, for example.

In each of the embodiments, the moving mechanism 26, 61 and the adjusting lever 36 are used as common components both in the embodiments of the Ottoman mechanism and in the embodiments of a seat cushion length adjustable mechanism. However, the moving mechanism 26, 61 and the adjusting lever 36 may be separate components provided according to each of the embodiments.

In each of the embodiments, the front end portion 41a, 56a may be manually adjusted.

Accordingly, the drum 31, 51 for adjusting the outer shape of the seat cushion 2, 7 is rotated by an operation (a swinging movement) of the adjusting lever 36, whose ends are respectively rotatably connected at the base member 11 and the drum 31, 51. Therefore, when the drum 31, 51 is rotated, unnecessary sliding resistance is prevented from being generated. Consequently, the operation force for rotating the drum 31, 51 (an operation force for adjusting the outer shape of the seat cushion 2, 7) is reduced.

According to the embodiment, the moving mechanism 26, 61 includes: the first lever 12 rotatably connected to the drum 31, 51; and the second lever 13 and the third lever 14, one end of each of the second lever 13 and the third lever 14 being rotatably connected to the base member 11 and the other end of each of the second lever 13 and the third lever 14 being rotatably connected to the first lever 12. The second lever 13 and the third lever 14 restrict the movement of the first lever 12 so as to move the drum 31, 51 in the front-rear direction of the seat 1, 6 relative to the base member 11.

Accordingly, one end of the second lever 13 and one end of the third lever 14, each of which is connected to the base member 11, form grounded ends, and thereby the first, second and third levers 12, 13 and 14 are configured as the four bar linkage, in which the movement of the first lever 12 is restricted by the second and third levers 13, 14. Consequently, the drum 31, 51, connected to the first lever 12, is moved relative to the base member 11 in the front-rear direction of the seat 1, 6. The moving mechanism 26, which moves the drum 31, 51 relative to the base member 11 in the front-rear direction of the seat 1, 6, is formed by a link mechanism (the four bar linkage), and therefore the moving mechanism 26 is more freely arranged.

According to the embodiment, the moving mechanism 26, 61 includes: a group of the first lever 12, the second lever 13 and the third lever 14 provided at each side of the seat 1, 6 in the width direction thereof; the connecting member 15 extending in the width direction of the seat 1, 6 and integrally connecting the first levers 12 each of which is provided at each side of the seat 1, 6 in the width direction thereof, and the driving member 20 connected to the connecting member 15 at an intermediate portion in a longitudinal direction thereof and generating a driving force for moving the connecting member 15 in the front-rear direction of the seat 1, 6. The connecting position of the first lever 12 to/with the connecting member 15 is arranged at a front side of a connecting position of the first lever 12 to/with each of the second lever 13 and the third lever 14 in the front-rear direction of the seat 1, 6 so that the driving member 20 and the first lever 12, the second lever 13 and the third lever 14 are arranged to at least partially overlap in the front-rear direction of the seat 1, 6.

Therefore, the entire structure of the seat cushion adjusting apparatus is downsized in the front-rear direction thereof.

According to the embodiment, the moving mechanism 26, 61 includes: the slider 63, rotatably connected to the drum 31, 51; and the guiding member 62, provided at the base member 11 and guiding the slider 63 to move the drum 31, 51 in the front-rear direction of the seat 1, 6 relative to the base member 11.

Accordingly, the moving mechanism 61 moves the drum 31, 51 in the front-rear direction of the seat 1, 6 relative to the base member 11 in a simple structure (a slide mechanism): the movement of the slider 63, at which the drum 31, 51 is connected, is guided by the guiding member 62, which is provided at the base member 11.

According to the embodiment, the seat member 41, 56 includes: the seat portion 41c, 56c; the front end portion 41a, 56a; and the deformed portion 41d, 56d, integrally provided between the seat portion 41c, 56c and the front end portion 41a, 56a and deformed in accordance with a rotation of the drum 31, 51 and thereby moving the front end portion 41a, 56a for an adjustment of the outer shape of the seat cushion 2, 7. The drum 31, 51 engages with the front end portion 41a, 56a so that the length of the front surface of the deformed portion 41d, 56d or of the intermediate surface 41b, 56b between an end close to the seat portion 41c, 56c and an end close to the front end portion 41a, 56a is unchanged regardless of a rotational state of the drum 31, 51, the intermediate surface 41b, 56b provided between the front surface of the deformed portion 41, 56 and a back surface thereof.

Accordingly, the front end portion 41a, 56a is engaged with the drum 31, 51 in the following manner: even when the drum 31, 51 is rotated, the length of front surface of the deformed portion 41d, 56d between the end close to the seat portion 41c, 56c and the end close to the front end portion 41a, 56a, is substantially the same. Therefore, it is prevented that the length of the front surface of the deformed portion is changed (extended and contracted). Further, the front end portion 41a, 56a is engaged with the drum 31, 51 in the following manner: even when the drum 31, 51 is rotated, a length of the intermediate surface between the end close to the seat portion 41c, 56c and the end close to the front end portion 41a, 56a, which is positioned between the front and back surfaces of the deformed portion 41d, 56d, is substantially the same. Therefore, it is prevented that a length of only one surface of the front and back surfaces of the deformed portion 41d, 56d is excessively changed. Therefore, it is prevented that the front or back surface of the deformed portion 41d, 56d is excessively extended or contracted. Therefore, it is prevented that the front or back surface of the deformed portion 41d, 56d is excessively extended or contracted.

According to the embodiment, the intermediate surface 41b, 56b is provided closer to the front surface of the deformed portion 41d, 56d than a center surface of the front surface and the back surface thereof is.

Accordingly, the change in length (extension and contraction) at the front surface side of the deformed portion 41d, 56d is restrained compared to the back surface side thereof.

According to the embodiment, the seat member 41, 56 includes the slit 43a, 58a, facilitating extension and contraction of the back surface of the deformed portion 41d, 56d.

Accordingly, extension and contraction of the back surface side of the deformed portion 41d, 56d is facilitated by the slit 43a, 58a. Therefore, the deformed portion 41d, 56d, or even the seat member 41, 56 are prevented from being excessively deformed in accordance with extension and contraction of the back surface of the deformed portion 41d, 56d.

According to the embodiment, the first lever 12, the second lever 13 and the third lever 14 are configured as a four bar linkage, in which one end of the second lever 13 and one end of the third lever 14 each of which is connected to the base member 11 form grounded ends.

According to the embodiment, the front end portion of the first lever 12, extending toward a front side of the seat 1, 6, is bent upward and the connecting member 15 is fixed at a bent portion of the first lever 12.

According to the embodiment, the connecting position of the first lever 12 to/with the connecting member 15 is arranged at the front side of a connecting position of the first lever 12 to/with each of the second lever 13 and the third lever 14.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat cushion adjusting apparatus comprising:
a supporting member forming a frame of a seat cushion;
a seat member supported by the supporting member and forming an outer shape of the seat cushion;
an adjusting member engaging with an end portion of the seat member provided at a front side thereof in a front-rear direction of a seat;
a moving mechanism rotatably connected to the adjusting member and moving the adjusting member in the front-rear direction of the seat relative to the supporting member; and
an adjusting lever, one end thereof rotatably connected to the supporting member and the other end thereof rotatably connected to the adjusting member wherein
the adjusting lever moves the end portion of the seat member by rotating the adjusting member around an axis, extending in a width direction of the seat, to adjust the outer shape of the seat cushion in accordance with a movement of the adjusting member in the front-rear direction of the seat relative to the supporting member by means of the moving mechanism,
wherein the seat member includes a seat portion, the end portion, and a deformed portion integrally provided between the seat portion and the end portion and deformed in accordance with a rotation of the adjusting member and thereby moving the end portion for an adjustment of the outer shape of the seat cushion, and
wherein the adjusting member engages with the end portion so that a length of a front surface of the deformed portion or of an intermediate surface between an end close to the seat portion and an end close to the end portion is unchanged regardless of a rotational state of the adjusting member, the intermediate surface provided between the front surface of the deformed portion and a back surface thereof.

2. The seat cushion adjusting apparatus according to claim 1, wherein
the moving mechanism includes:
a first lever rotatably connected to the adjusting member; and
a second lever and a third lever, one end of each of the second lever and the third lever being rotatably connected to the supporting member and the other end of each of the second lever and the third lever being rotatably connected to the first lever and wherein
the second lever and the third lever restrict a movement of the first lever so as to move the adjusting member in the front-rear direction of the seat relative to the supporting member.

3. The seat cushion adjusting apparatus according to claim 2, wherein
the moving mechanism includes:
a group of the first lever, the second lever and the third lever provided at each side of the seat in the width direction thereof;
a connecting member extending in the width direction of the seat and integrally connecting the first levers each of which is provided at each side of the seat in the width direction thereof; and
a driving member connected to the connecting member at an intermediate portion in a longitudinal direction thereof and generating a driving force for moving the connecting member in the front-rear direction of the seat; and wherein
a connecting position of the first lever to/with the connecting member is arranged at a front side of a connecting position of the first lever to/with each of the second lever and the third lever in the front-rear direction of the seat so that the driving member and the first lever, the second lever and the third lever are arranged to at least partially overlap in the front-rear direction of the seat.

4. The seat cushion adjusting apparatus according to claim 3, wherein
the first lever, the second lever and the third lever are configured as a four bar linkage, in which one end of the second lever and one end of the third lever each of which is connected to the supporting member form grounded ends.

5. The seat cushion adjusting apparatus according to claim 4, wherein
a front end portion of the first lever, extending toward a front side of the seat, is bent upward and the connecting member is fixed at a bent portion of the first lever.

6. The seat cushion adjusting apparatus according to claim 5, wherein a connecting position of the first lever to/with the connecting member is arranged at a front side of a connecting position of the first lever to/with each of the second lever and the third lever.

7. The seat cushion adjusting apparatus according to claim 1, wherein
the moving mechanism includes:
a slider rotatably connected to the adjusting member; and
a guiding member provided at the supporting member and guiding the slider to move the adjusting member in the front-rear direction of the seat relative to the supporting member.

8. The seat cushion adjusting apparatus according to claim 1, wherein
the intermediate surface is provided closer to the front surface of the deformed portion than a center surface of the front surface and the back surface thereof is.

9. The seat cushion adjusting apparatus according to claim 8, wherein
the seat member includes a slit allowing extension and contraction of the back surface of the deformed portion.

10. The seat cushion adjusting apparatus according to claim 1, wherein
the seat member includes a slit facilitating extension and contraction of the back surface of the deformed portion.

* * * * *